(12) United States Patent
Street (10) Patent No.: US 8,955,830 B2
(45) Date of Patent: Feb. 17, 2015

(54) END MEMBER ASSEMBLY, GAS SPRING ASSEMBLY AND METHOD

(75) Inventor: Stephen C. Street, Carmel, IN (US)

(73) Assignee: Firestone Industrial Products Company, LLC, Indianapolis, IN (US)

( * ) Notice: Subject to any disclaimer, the term of this patent is extended or adjusted under 35 U.S.C. 154(b) by 155 days.

(21) Appl. No.: 13/574,505

(22) PCT Filed: Dec. 28, 2009

(86) PCT No.: PCT/US2009/069613
§ 371 (c)(1),
(2), (4) Date: Jul. 20, 2012

(87) PCT Pub. No.: WO2011/081622
PCT Pub. Date: Jul. 7, 2011

(65) Prior Publication Data
US 2012/0313304 A1    Dec. 13, 2012

(51) Int. Cl.
| F16F 5/00 | (2006.01) |
| B60G 11/27 | (2006.01) |
| B60G 11/28 | (2006.01) |
| F16F 9/05 | (2006.01) |

(52) U.S. Cl.
CPC .............. *B60G 11/27* (2013.01); *B60G 11/28* (2013.01); *F16F 9/057* (2013.01); *B60G 2202/152* (2013.01); *B60G 2204/126* (2013.01)
USPC .......................................... 267/122; 267/66

(58) Field of Classification Search
USPC .............. 267/64.27, 64.19, 122, 66, 35, 153, 267/292, 293
See application file for complete search history.

(56) References Cited

U.S. PATENT DOCUMENTS

| 4,506,910 A | 3/1985 | Bierens |
| 5,382,006 A | 1/1995 | Arnold |
| 7,328,887 B2 * | 2/2008 | Leonard .................... 267/64.27 |
| 2007/0096374 A1 | 5/2007 | Scholz |

FOREIGN PATENT DOCUMENTS

| JP | 2000-097273 | 4/2000 |
| JP | 2004-197839 | 7/2004 |
| JP | 2005-106088 | 4/2005 |
| WO | WO 00-73676 | 12/2000 |

OTHER PUBLICATIONS

International Search Report.

* cited by examiner

*Primary Examiner* — Melanie Torres Williams
(74) *Attorney, Agent, or Firm* — Jason A. Houser; Fay Sharpe, LLP (57) ABSTRACT

A piston assembly includes an outer shell, an end plate and an attachment column. A first flowed-material joint is disposed between and fixedly attaches the end plate and the outer shell to one another such that a fluid-tight seal is formed therebetween. A second flowed-material joint is disposed between and fixedly attaches the attachment column and the end plate to one another such that a fluid-tight seal is formed therebetween. A gas spring assembly and method that include the piston assembly are also included.

20 Claims, 6 Drawing Sheets

FIG. 6

END MEMBER ASSEMBLY, GAS SPRING ASSEMBLY AND METHOD

BACKGROUND

The subject matter of the present disclosure broadly relates to the art of spring devices and, more particularly, to an end member assembly that includes a substantially fluid-tight chamber as well as a gas spring assembly and method that utilize such an end member assembly.

It will be appreciated that the subject matter of the present disclosure is amenable to broad use in a wide variety of applications and environments. One example of a suitable application includes use of the subject end member assembly and gas spring assembly formed therefrom in connection with a suspension system of an associated vehicle. And, the subject matter of the present disclosure will be discussed in detail hereinafter with specific reference to such use in operative association with an associated vehicle suspension system. However, it is to be specifically understood that the subject matter of the present disclosure is capable of broad application and use, and is not intended to be limited to this specific example of one suitable application and/or use.

Vehicle suspension systems that utilize pressurized gas (e.g., pressurized air) are well known and commonly used. It has been recognized that loss of pressurized gas from such suspension systems can, in some cases, result in reduced performance of the suspension system during dynamic use and operation thereof. Additionally, such pressurized gas losses can also, in some cases, increase the cost of operation of such pressurized gas suspension systems. For example, pressurized gas losses can cause a compressor operatively connected to the suspension system to operate at an increased frequency and/or operate for increased durations to replenish escaped pressurized gas. Thus, minimizing pressurized gas losses has been identified as being generally beneficial to the performance and operation of pressurized gas suspension systems.

For at least the foregoing reasons, it is generally desirable to minimize pressurized gas losses in vehicle suspension systems as well as other applications and uses. Thus, it is a well known and common practice to manufacture gas spring assemblies that are substantially fluid tight and which are capable of retaining a volume of pressurized gas for at least a certain duration without incurring pressurized gas losses.

Certain characteristics, which have been identified as being associated with the capability to provide such pressurized gas retention and/or performance, generally relate to the overall design and overall construction of end members of the gas spring assembly, such as end members that are commonly used in association with rolling lobe-type gas spring assemblies. Such end members are often referred to in the art as "pistons" or "roll-off pistons," and are generally designed and constructed to fluidically isolate an internal chamber of the gas spring assembly from an external atmosphere along one end of the flexible wall of the gas spring assembly.

A wide variety of piston designs have been developed in an effort to optimize or otherwise balance desired performance characteristics, such as strength and fluid isolation, for example, with other characteristics, such as manufacturability and cost, for example. As a result of such efforts, increasingly sophisticated piston designs have been developed that, in some cases, include an increased number of components that are assembled together to form the piston. In some situations, however, the inclusion and use of an increased number of components can result in designs that can have numerous potential leakage pathways, such as, for example, may be due to variations in fit and/or alignment resulting from manufacturing tolerances and/or may be due to changes in size, shape and/or relative position during use. As a result, further development efforts have generated designs that include a corresponding number of sealing elements and/or other components to minimize pressurized gas losses by way of such pathways.

However, certain disadvantages of such piston constructions have been observed that may be limiting the overall adoption and use thereof. For example, vibration and other movement between component parts may lead to wear and/or degradation of sealing elements and permit leakage pathways to develop. Additionally, the added components increase the number of parts that are manufactured and inventoried, which can undesirably increase the overall cost of such piston constructions. Furthermore, such constructions can involve increasingly complex assembly techniques that can, in turn, undesirably increase assembly time and result in the attendant reductions in productivity and increases in manufacturing, assembly and/or other costs.

Accordingly, it is believed desirable to develop an end member assembly as well as a gas spring assembly and method that overcome these and/or other disadvantages of known end member constructions.

BRIEF DESCRIPTION

One example of a gas spring assembly in accordance with the subject matter of the present disclosure can include a flexible wall that extends circumferentially about a longitudinal axis and generally longitudinally between opposing first and second ends. The flexible wall can at least partially define a spring chamber of the gas spring assembly. A first end member can be operatively connected across the first end of the flexible wall such that a substantially fluid-tight seal is formed therebetween. A piston assembly can be operatively connected to the flexible wall along the second end thereof such that a substantially fluid-tight seal is formed therewith. The piston assembly can include an outer shell that is formed from thin-walled metal material and has a first end and a second end spaced longitudinally from the first end. The outer shell can include a side wall extending longitudinally between the first and second ends. The outer shell can include an end wall extending transverse to the side wall along the first end and can have a first opening extending therethrough. The side wall can at least partially define a second opening along the second end of the outer shell. An end plate can be formed from thin-walled metal material and can have an outer peripheral edge. An attachment column can extend longitudinally between opposing first and second ends. The first end can be disposed in abutting engagement with the end plate such that the second end is disposed toward the end wall of the outer shell. The outer shell, the end plate and the attachment column can together define a piston chamber within the piston assembly with a first flowed-material joint disposed between and fixedly attaching the end plate and the outer shell to one another such that a fluid-tight seal is formed therebetween and a second flowed-material joint disposed between and fixedly attaching the attachment column and the end plate to one another such that a fluid-tight seal is formed therebetween.

One example of a piston assembly in accordance with the subject matter of the present disclosure that is adapted for operative connection to an end of an associated flexible sleeve can include an outer shell formed from thin-walled metal material. The outer shell can have a longitudinal axis and longitudinally-spaced first and second ends. The outer shell can include a side wall and an end wall. The side wall can extend generally longitudinally between the first and second ends and can include an inner surface and an outer surface. The inner surface can at least partially define a piston chamber. The outer surface can be operative to abuttingly engage the associated flexible sleeve. The end wall can extend transverse to the side wall along the first end and can at least partially define a first opening along the first end in fluid communication with the piston chamber. The side wall can at least partially define a second opening along the second end. An end plate can be formed from thin-walled metal material and including a first side, an opposing second side, and an outer peripheral edge. The end plate can be received within the second opening of the outer shell such that the outer peripheral edge abuttingly engages the inner surface of the side wall of the outer shell. An attachment column can extend longitudinally between opposing first and second ends with the first end disposed toward the first end of the outer shell and the second end disposed toward the second end of the outer shell. The attachment column can abuttingly engage the first side of the end plate. A first flowed-material joint can be disposed between and fixedly attach the end plate and the outer shell to one another such that a fluid-tight seal is formed therebetween. A second flowed-material joint can be disposed between and fixedly attach the attachment column and the end plate to one another such that a fluid-tight seal is formed therebetween.

One example of a method of assembling a gas spring assembly in accordance with the subject matter of the present disclosure can include providing a flexible wall that extends longitudinally between opposing first and second ends. The method can also include providing a first end member and operatively connecting the first end member across the first end of the flexible wall such that a substantially fluid-tight seal is formed therebetween. The method can further include providing an outer shell, an end plate and an attachment column. The method can also include forming a piston assembly using the outer shell, the end plate and the attachment column by: 1) fixedly attaching the attachment column and the end plate to one another using a first flowed-material joint such that a fluid-tight seal is formed therebetween; and, 2) fixedly attaching the end plate and the outer shell to one another using a second flowed-material joint such that a fluid-tight seal is formed therebetween. The method can further include operatively connecting the piston assembly to the second end of the flexible wall such that a substantially fluid-tight seal is formed therebetween.

DETAILED DESCRIPTION

Turning now to the drawings, wherein the showings illustrate examples of the present novel concept and are not to be interpreted as limiting the same, one example of a gas spring assembly 100 is shown in FIGS. 1-5. Gas spring assembly 100 includes a first end member, an opposing second end member and a flexible wall that is operatively connected therebetween to at least partially form a spring chamber. Gas spring assembly 100 can operatively connected between opposing structural components in any suitable manner, such as are generally represented by upper structural component USC and lower structural component LSC in FIGS. 4 and 5, for example.

In the exemplary arrangement shown in FIGS. 1-5, gas spring assembly 100 includes a longitudinally-extending axis AX, a first or upper end member, such as a bead plate 102, for example, and an opposing second or lower end member, such as a piston assembly 104, for example, that is spaced longitudinally from the first end member. A flexible wall, such as a flexible sleeve 106, for example, can be secured between the first end member (e.g., bead plate 102) and the second end member (e.g., piston assembly 104) in a suitable manner such that a spring chamber 108 is at least partially formed therebetween.

Flexible sleeve 106 extends in a generally longitudinal manner between a first or upper sleeve end 110 and a second or lower sleeve end 112. Flexible sleeve 106 includes a first or upper mounting bead 114 along first sleeve end 110 and a second or lower mounting bead 116 formed along second sleeve end 112. Mounting beads 114 and 116 can optionally include a reinforcing element or other suitable component, such as a bead wire 118, for example.

First mounting bead 114 of the flexible sleeve is captured by an outer peripheral edge 120 of bead plate 102. The peripheral edge can be deformed around the upper mounting bead in any manner suitable for forming a substantially fluid-tight seal therewith. One or more securement devices, such as mounting studs 122, for example, can be included along bead plate 102 and project through the associated structural component (e.g., upper structural component USC) in a manner suitable for receiving a corresponding securement device or element (not shown) to secure the first end member to the associated structural component. In the exemplary embodiment shown in FIGS. 4 and 5, mounting studs 122 project outwardly from the bead plate and extend through upper structural component USC.

Additionally, a fluid communication port, such as a fluid passage 124, for example, can optionally be provided on the first or upper end member to permit fluid communication with spring chamber 108. In the exemplary embodiment shown, fluid passage 124 extends through bead plate 102 and is in fluid communication with the spring chamber. It will be appreciated, however, that any other suitable fluid communication arrangement could alternately be used.

The second end of the flexible wall can be secured to the second end member in any suitable manner. For example, lower mounting bead 116 of flexible sleeve 106 can be captured between an end closure 126 and piston assembly 104. The end closure can be of any suitable size, shape, configuration and/or arrangement. In the exemplary embodiment shown in FIGS. 4-6, end closure 126 is shown as including a bottom or base wall portion 128 and an outer or side wall portion 130 that is disposed radially outwardly from the bottom wall portion. Additionally, outer wall portion 130 projects longitudinally outwardly from a plane defined by bottom wall portion 128 such that the outer wall portion is generally disposed at an included angle (not identified) relative thereto. Outer wall portion 130 can be of any suitable shape and/or configuration, such as including frustoconical, tapered and/or curved areas, for example.

Additionally, it will be appreciated that end closure 126 can be secured on the piston assembly in any suitable manner and using a suitable securement device or components. For example, end closure 126 can include a securement passage 132 extending through bottom wall portion 128. A securement element or fastener 134 can extend through passage 132 and threadably engage piston assembly 104 for securement of the end closure to the piston assembly. Optionally, one or more additional securement devices or components can also be used, such as a lock washer 136, for example. Furthermore, a jounce bumper (not shown) or other contact-inhibiting device can be secured within the spring chamber in a suitable manner, such as by being secured to or otherwise supported on securement element 134, for example.

An end member in accordance with the subject matter of the present disclosure, such as piston assembly 104, for example, can include a plurality of components that are fixedly attached or otherwise non-removably secured to one another by flowed-material joints such that substantially fluid-tight seals are formed between the attached components in the areas where the components are non-removably secured to one another. In this manner, an end member in accordance with the subject matter of the present disclosure can fluidically isolate the spring chamber of the gas spring assembly from an external atmosphere. Additionally, an end member in accordance with the subject matter of the present disclosure can undergo substantial deflection and/or deformation during assembly, installation and/or use, while maintaining seal integrity at joints between components and thereby reduce or at least minimize pressurized gas losses that may otherwise occur through potential leakage pathways of known piston constructions.

Figure 4:
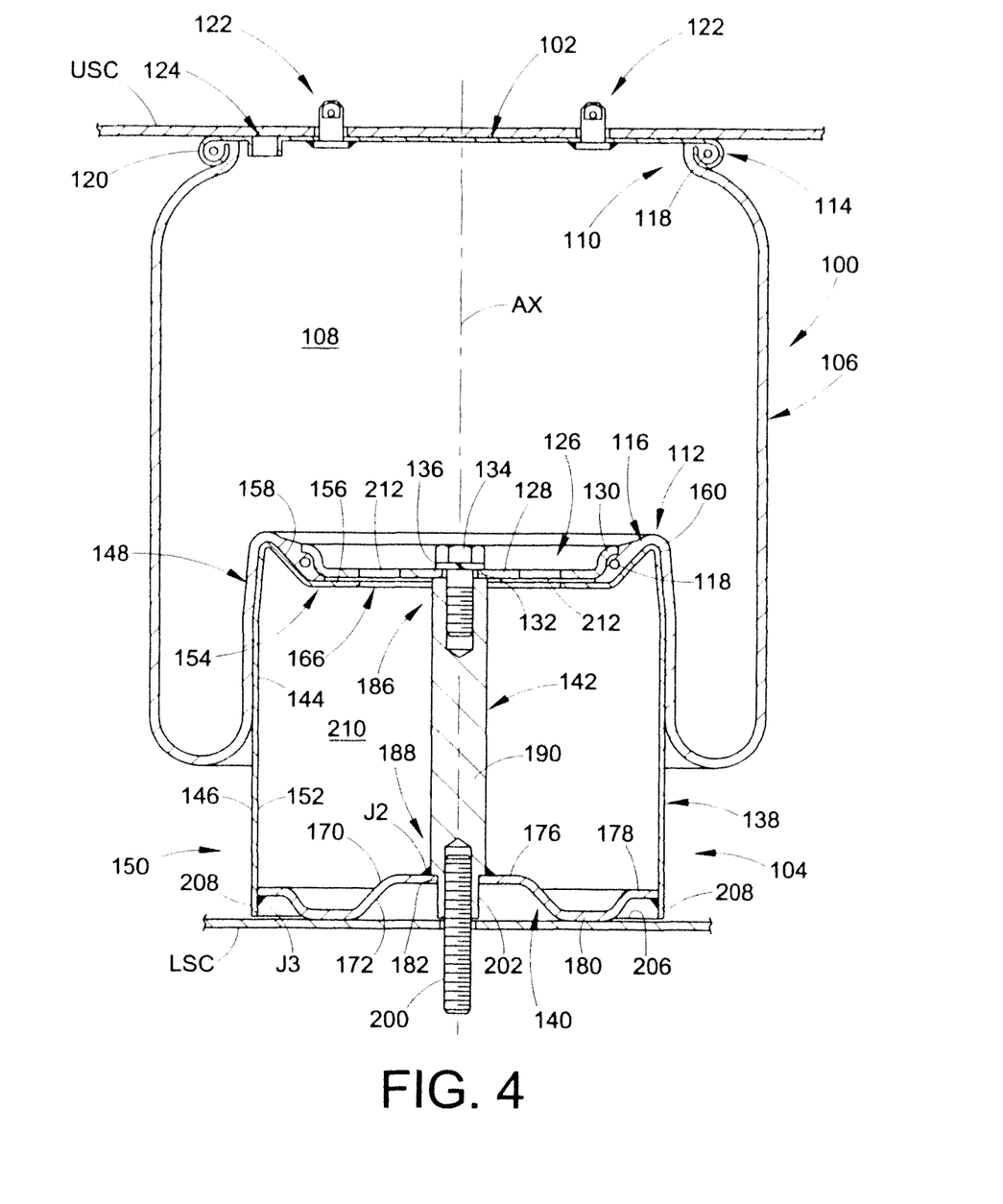
FIG. 4 is a cross-sectional side view of the gas spring assembly shown in FIGS. 1-3 taken along line 4-4 in FIG. 3.
Figure 5:
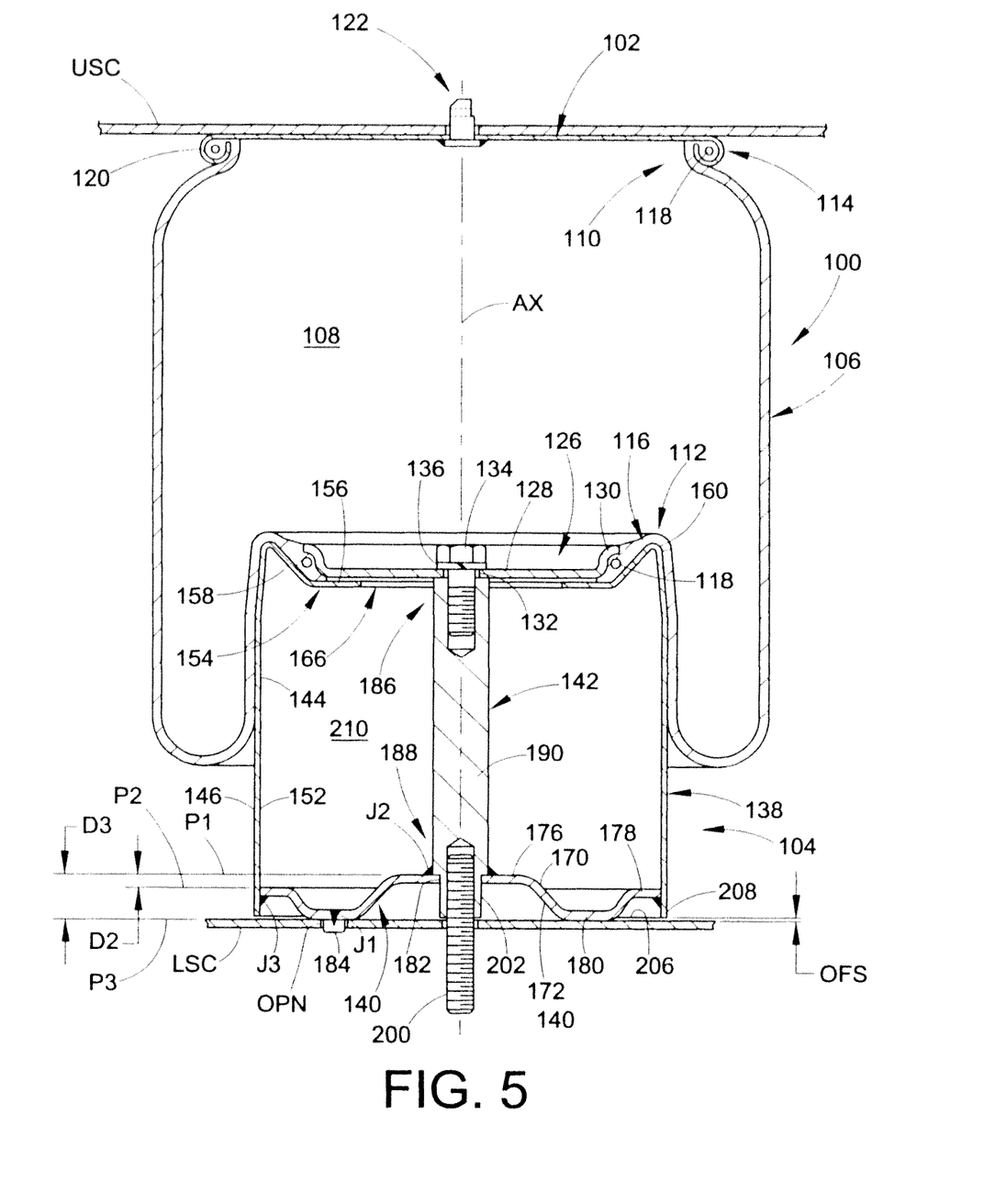
FIG. 5 is a cross-sectional side view of the gas spring assembly shown in FIGS. 1-4 taken along line 5-5 in FIG. 3.
Figure 6:
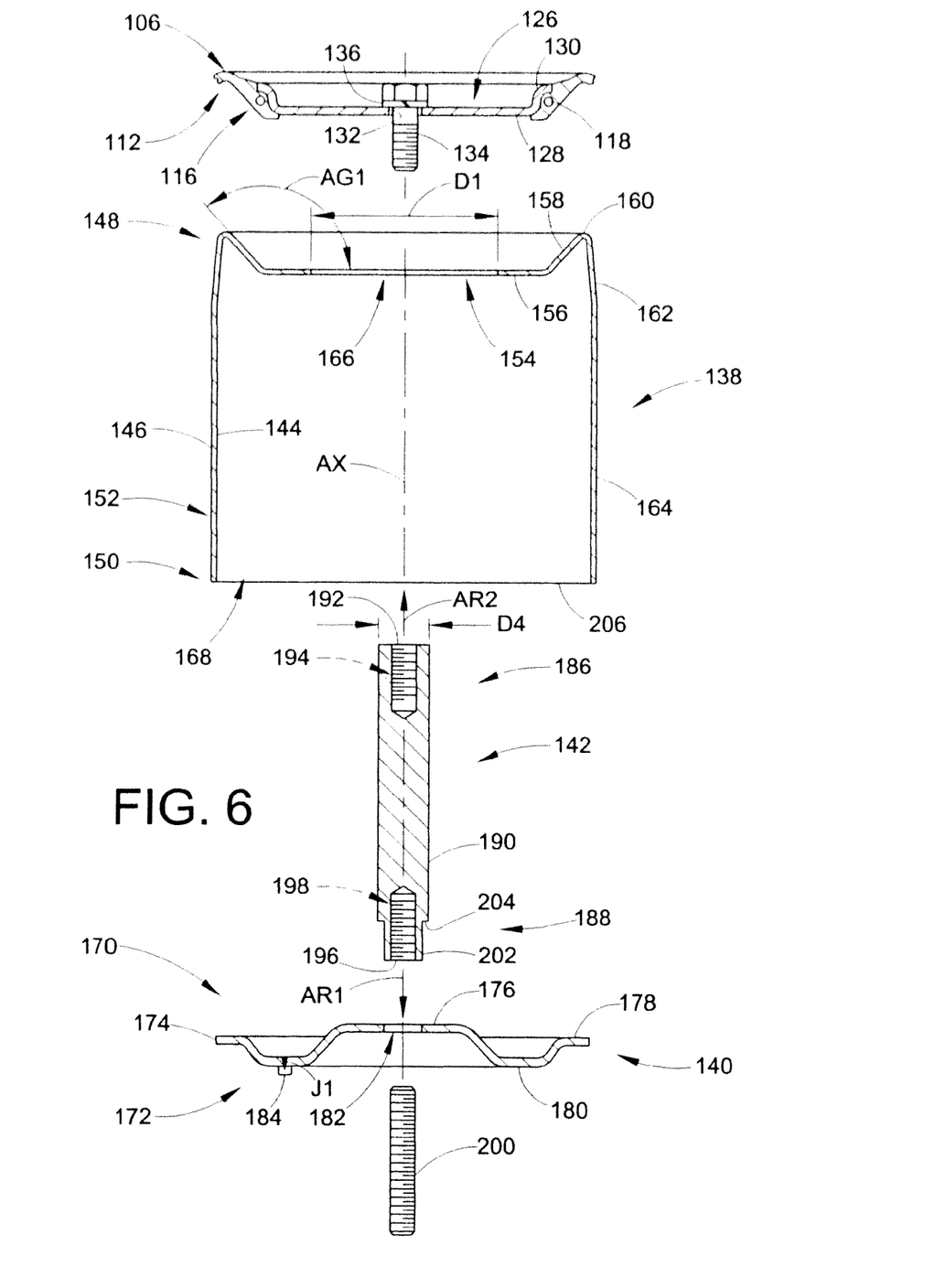
FIG. 6 is an exploded side view, in partial cross section, of the exemplary end member assembly shown in FIGS. 1-5.

An end member in accordance with the subject matter of the present disclosure, such as piston assembly 104, for example, can include an outer shell, an end plate and an attachment column, such as are respectively identified by item numbers 138, 140 and 142 in FIGS. 4-6, for example. It will be appreciated, however, that other constructions, configurations and/or arrangements consistent with a broad interpretation of the subject matter of the present disclosure could alternately be used.

Outer shell 138 is preferably formed from thin-walled metal material, such as steel or aluminum, for example, and has an inner surface and an outer surface, which are generally identified by item numbers 144 and 146, respectively. The outer shell extends longitudinally between a first end 148 and an opposing second end 150. Outer shell 138 includes a side wall 152 that extends generally longitudinally between the first and second ends and also includes an end wall 154 that is disposed in generally transverse relation to side wall 152. End wall 154 includes a bottom or base wall portion 156 and an outer or side wall portion 158 that extends radially-outwardly from base wall portion 156 and transitions to side wall 152 at a rounded or otherwise curved shoulder 160.

It will be appreciated that outer shell 138 can be of any suitable size, shape, configuration and/or arrangement. For example, side wall 152 is shown as including a first side wall portion 162 that transitions from shoulder 160 along first end 148 and has an approximately frustoconical shape. Side wall 152 is also shown as including a second side wall portion 164 that extends toward second end 150 from along first side wall portion 162 and has an approximately cylindrical shape. Additionally, base wall portion 156 of end wall 154 is shown as being approximately planar such that outer wall portion 158 projects longitudinally outwardly from a plane defined by base wall portion 156 such that outer wall portion 158 is generally disposed at an included angle AG1 (FIG. 6) relative thereto. Outer wall portion can be of any suitable shape and/or configuration, such as including frustoconical, tapered and/or curved areas, for example. Additionally, it will be appreciated that included angle AG1 can be within any suitable range of angles, such as from approximately 95 degrees to approximately 175 degrees, for example.

Figure 1:
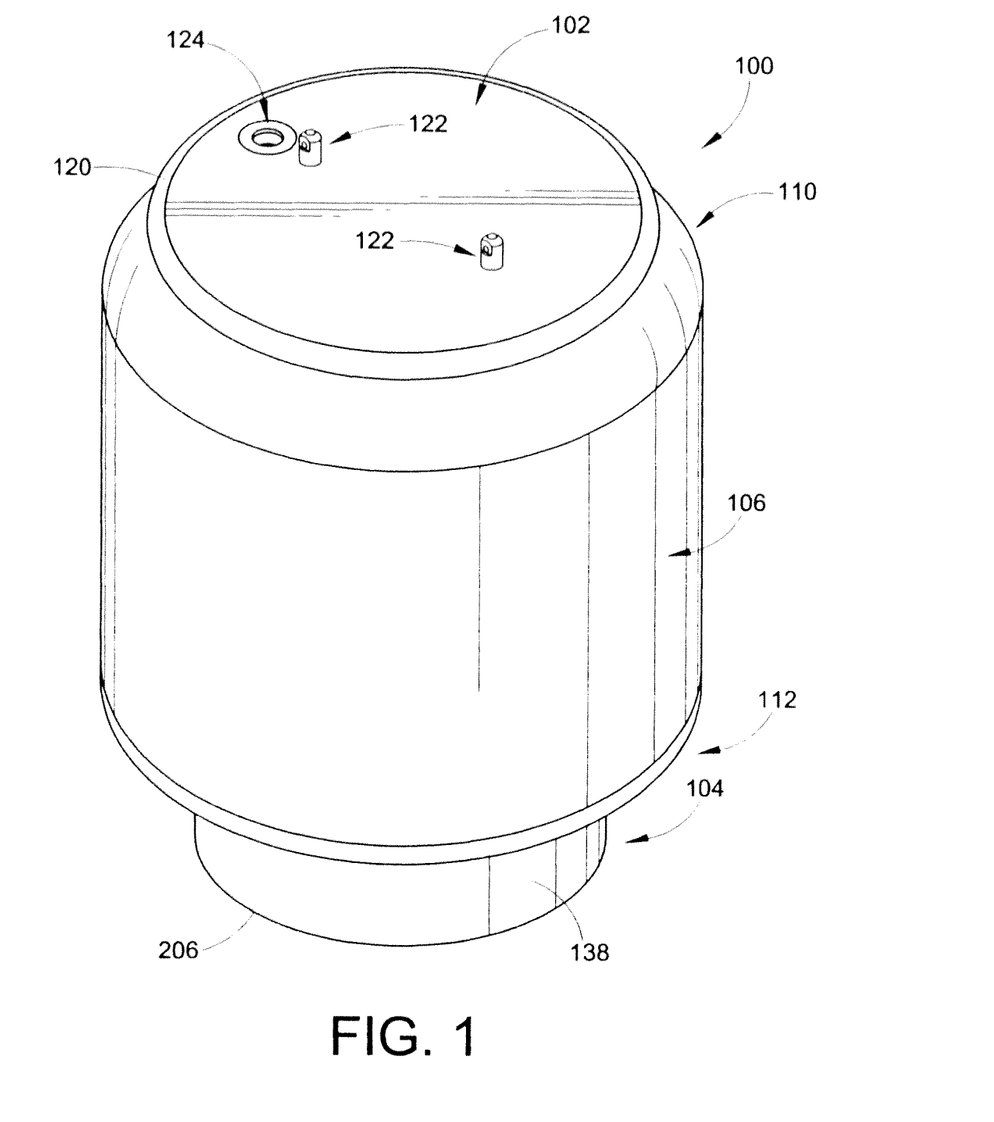
FIG. 1 is a top perspective view of a gas spring assembly that includes one example of an end member assembly in accordance with the subject matter of the present disclosure.
Figure 2:
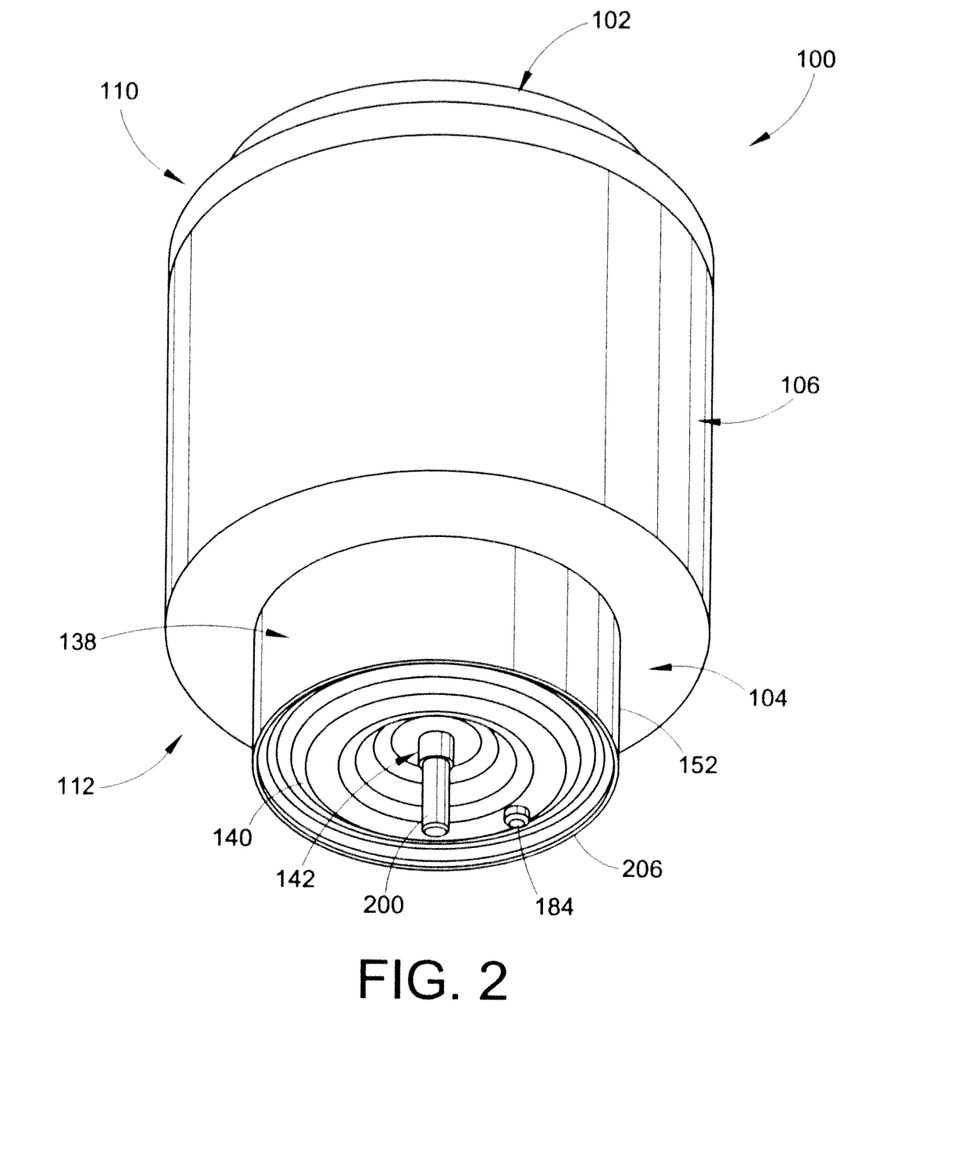
FIG. 2 is a bottom perspective view of the gas spring assembly shown in FIG. 1.
Figure 3:
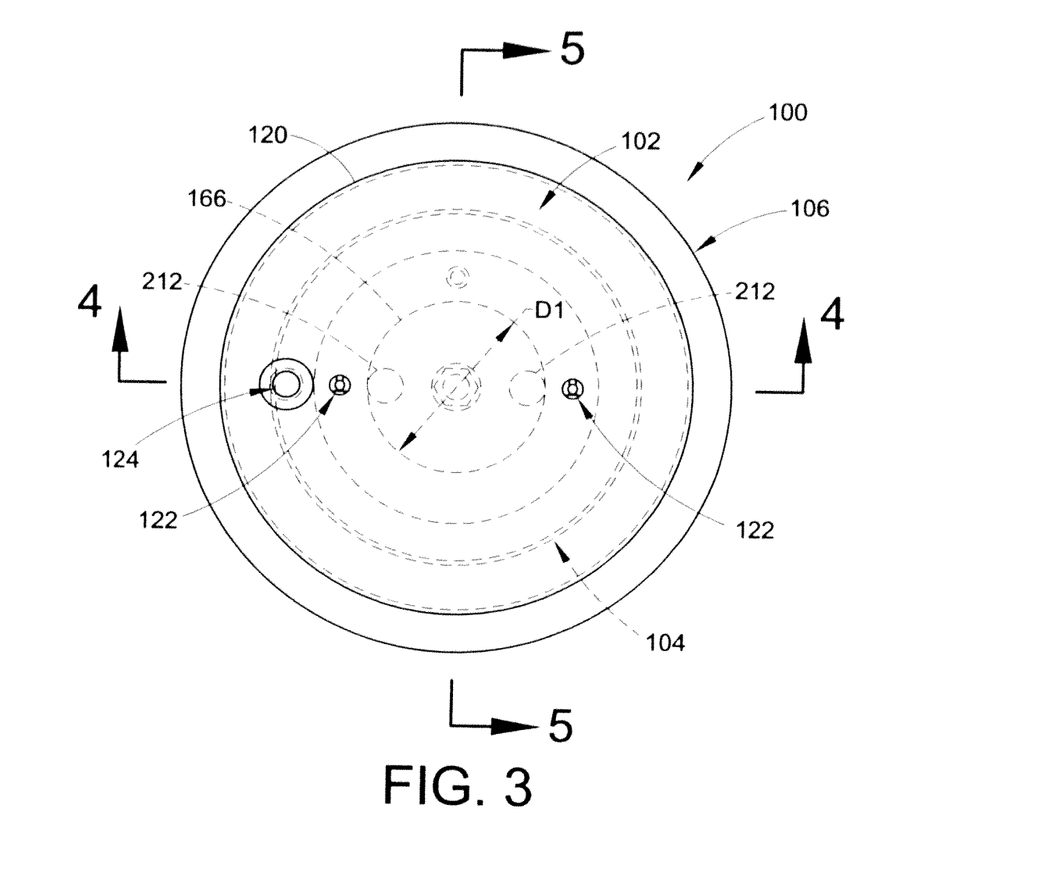
FIG. 3 is a top plan view of the gas spring assembly shown in FIGS. 1 and 2.

Base wall portion 156 of end wall 154 at least partially defines an opening 166 that extends through the end wall of the outer shell. As indicated in FIGS. 3 and 6, opening 166 has a cross-sectional dimension D1. Additionally, side wall 152 at least partially defines an opening 168 (FIG. 6) in second end 150 of outer shell 138.

End plate 140 is preferably formed from thin-walled metal material, such as steel or aluminum, for example. End plate 140 has opposing first and second sides 170 and 172 as well as an outer peripheral edge or extent 174 (FIG. 6). End plate 140 includes a first or central wall portion 176, a second or outer wall portion 178 and a third or intermediate wall portion 180 disposed radially between the first and second wall portions. Additionally, an opening 182 extends through end plate 140 and shown in FIGS. 3-6 as being disposed approximately centrally on first wall portion 176 of the end plate.

As identified in FIG. 5, first wall portion 176 of end plate 140 includes an approximately planar area that generally defines a first plane P1. Second wall portion 178 includes an approximately planar area disposed toward outer peripheral edge 174 that generally defines a second plane P2 that is offset or otherwise spaced from first plane P1, as is indicated by reference dimension D2. Third wall portion 180 also includes an approximately planar area that generally defines a third plane P3 that is offset or otherwise spaced from the first and second planes, as is indicated by reference dimension D3. It will observed from FIGS. 4-6 that offset 02 is less than offset D3 such that second wall portion 178 is disposed longitudinally between first and third wall portions 176 and 180.

End plate 140 can also optionally include one or more additional features and/or components. For example, end plate 140 is shown as including an optional projection or locating feature 184 that can, for example, be used to locate or otherwise orient the gas spring assembly on lower structural component LSC by positioning projection 184 within an opening OPN provided therein. Projection 184 is shown as being disposed on third wall portion 180 and projects outwardly therefrom on second side 172 of the end plate. Projection 184, if provided, is preferably fixedly attached or otherwise non-removably secured to the third wall portion such that a substantially, if not fully, fluid-tight seal is formed therebetween, such as by using a flowed-material joint J1 (e.g., a weld), for example.

Attachment column 142 extends longitudinally between opposing first and second ends 186 and 188 and includes an outer surface 190 having an outer dimension D4. In a preferred arrangement, attachment column 142 is formed from length of solid material, such as metal (e.g., steel or aluminum), for example. In such case, potential leakage pathways extending longitudinally through the attachment column can be avoided. Additionally, in a preferred arrangement, outer dimension D4 is less than inner cross-sectional dimension D1 of opening 166. In this manner, deflection and/or misalignment of attachment column 142 can be accommodated without potential interference with outer shell 138 (e.g., without abutting engagement with end wall 154).

Attachment column 142 includes a first end wall 192 extending generally transverse to longitudinal axis AX along first end 186. A first threaded passage 194 extends at least partially into the attachment column from along first end wall 192 and, in a preferred arrangement, is dimensioned to operatively engage fastener 134, such as may be used to secure second end 112 of the flexible sleeve to piston assembly 104, for example. Attachment column 142 also includes a second end wall 196 that extends generally transverse to the axis along second end 188. A second threaded passage 198 is shown as extending at least partially into the attachment column from along second end wall 196 and, in a preferred arrangement, is dimensioned to operatively engage a securement device or fastener 200, such as may be used to secure piston assembly 104 on or along an associated structural component (e.g., lower structural component LSC).

Attachment column 142 can be fixedly attached or otherwise non-removably secured to end plate 140 in any suitable manner. As one example, the second end wall of the attachment column could be disposed in abutting engagement with the first wall portion of the end plate. As another example, attachment column 142 can optionally include an outer side wall portion 202 that has an outer dimension (not identified) that is less than outer dimension D4 of outer surface 190 such that a shoulder wall 204 is formed toward second end 188 of the attachment column. Outer side wall portion 202 can be dimensioned to be received within opening 182 of end plate 140 such that shoulder wall 204 abuttingly engages first wall portion 176 of the end plate along first side 170 thereof, such as is indicated in FIG. 6 by arrow AR1, for example. In such arrangement, at least some amount of outer side wall portion 202 will project longitudinally outwardly from first wall portion 176 along second side 172 of the end plate.

In a preferred arrangement, attachment column 142 is fixedly attached or otherwise non-removably secured to end plate 140 by way of a flowed-material joint (e.g., a weld). In this manner, a substantially fluid-tight seal can be formed therebetween, such as has been discussed above. It will be appreciated that the flowed-material joint can be deposited or otherwise formed between any suitable combination of features of the end plate and the attachment column. In the exemplary arrangement shown in FIGS. 4 and 5, a flowed-material joint J2 is disposed between and/or along outer surface 190 of attachment column and first side 170 of first wall portion 176. As indicated above, however, the flowed-material joint could alternately be disposed between and/or along other combinations of features, such as outer side wall portion 202 of the attachment column and second side 172 of first wall portion 176, for example. Regardless of the areas between which flowed-material joint J2 is deposited or otherwise formed, flowed-material joint J2 is preferably includes a full peripheral or otherwise all-around joint that extends continuously along the areas between which the joint is formed such that the fluid-tight seal is formed thereby.

Upon depositing or otherwise forming flowed-material joint J2 between end plate 140 and attachment column 142, the end plate and attachment column can take the form of a sub-assembly that can then be assembled together with outer shell 138. In such case, the assembled end plate and attachment column can be positioned within outer shell 138 in a suitable configuration and/or arrangement. Alternately, end plate 140 can be fixedly attached or otherwise non-removably secured together with outer shell 138 prior to assembling the end plate and attachment column together. In such case, the end plate alone could be positioned within the outer shell in a suitable configuration and/or arrangement and fixedly attached or otherwise non-removably secured thereto. The attachment column could then be assembled together with the end plate, such as in the manner described above, for example.

Regardless of the order in which assembly is performed, end plate 140, either alone or together with the attachment column, can be inserted or otherwise fitted into outer shell 138 such that outer peripheral edge 174 of end plate 140 is adjacent or even at least partially abuttingly engaging inner surface 144 along side wall 152 toward second end 150 of the outer shell, such as is represented by arrow AR2 (FIG. 6). The end plate can optionally be positioned such that plane P3 of third wall portion 180 is disposed outwardly of a longitudinal edge 206 of side wall 152 such that the outer shell can be supported in spaced relation to the associated structural component (e.g., lower structural component LSC), such as is represented in FIG. 5 by reference dimension OFS. Additionally, or in the alternative, second side wall portion 178 can be positioned in inwardly-spaced relation to longitudinal edge 206 of side wall 152 such that an end portion 208 (FIG. 4) of side wall 152 extends longitudinally outwardly beyond the second side wall portion.

Regardless of the position of the end plate relative to one or more of the various features of the outer shell, end plate 140 can be fixedly attached or otherwise non-removably secured to outer shell 138 by way of a flowed-material joint (e.g., a weld). In this manner, a substantially fluid-tight seal can be formed therebetween, such as has been discussed above. It will be appreciated that the flowed-material joint can be deposited or otherwise formed between any suitable combination of features of the end plate and the outer shell. In the exemplary arrangement shown in FIGS. 4 and 5, a flowed-material joint J3 is disposed between and/or along inner surface 144 of outer shell 138 and second side 172 of second wall portion 178 of the end plate. As indicated above, however, the flowed-material joint could alternately be disposed between and/or along other combinations of features, such as inner surface 144 of the outer shell and first side 170 of second wall portion 178, for example. As also discussed above, regardless of the areas between which flowed-material joint J3 is deposited or otherwise formed, flowed-material joint J3 is preferably includes a full peripheral or otherwise all-around joint that extends continuously along the areas between which the joint is formed such that the fluid-tight seal is formed thereby.

Prior to assembly with second end 112 of flexible sleeve 106 and end closure 126, it will be recognized that first end 186 of attachment column 142 is cantilevered or otherwise freely supported with respect to outer shell 138. As such, reasonable amounts of misalignment and/or deflection of the attachment column can be accommodated by displacing the first end of the attachment column into a desired position during the process of assembling the second end of the flexible sleeve and/or the end closure to the piston assembly. It will be recognized that any such displacement can be accommodated without resulting in the misalignment of other components that could generate a potential leakage pathway. That is, full and solid flowed-material joints J2 and J3 are expected to permit components to be deflected and deformed while maintaining a substantially, if not fully, fluid-tight seal between the components of the piston assembly.

Once assembled, piston assembly 104 forms a piston chamber 210 that can be placed in fluid communication with spring chamber 108 in any suitable manner. As described above, piston assembly 104 functions to maintain pressurized gas within the gas spring assembly in fluid isolation from an external atmosphere. It will be appreciated that in the exemplary embodiment shown herein, lower mounting bead 116 on second sleeve end 112 of the flexible sleeve is captured between end closure 126 and piston assembly 104 such that a substantially fluid-tight seal is formed therebetween. As such, opening 166 of piston assembly 104 is in fluid communication with end closure 126. The end closure can include one or more openings 212 formed therethrough, such as through bottom wall portion 128, for example, that are capable of placing spring chamber 108 and piston chamber 210 in fluid communication with one another in a suitable manner. It will be appreciated, however, that other arrangements could be used to permit fluid communication between spring chamber 108 and piston chamber 210.

As used herein with reference to certain elements, components and/or structures, numerical ordinals (e.g., "first end" and "second end") merely denote different singles of a plurality and do not imply any order or sequence unless specifically defined by the claim language. Additionally, the terms "transverse," and the like, are to be broadly interpreted. As such, the terms "transverse," and the like, can include a wide range of relative angular orientations that include, but are not limited to, an approximately perpendicular angular orientation.

Furthermore, the phrase "flowed-material joint" and the like are to be interpreted to include any joint or connection in which a liquid or otherwise flowable material (e.g., a melted metal or combination of melted metals) is deposited or otherwise presented between adjacent component parts and operative to form a fixed and substantially fluid-tight connection therebetween. Examples of processes that can be used to form such a flowed-material joint include, without limitation, welding processes, brazing processes and soldering processes. In such cases, one or more metal materials and/or alloys can be used to form such a flowed-material joint, in addition to any material from the component parts themselves. Another example of a process that can be used to form a flowed-material joint includes applying, depositing or otherwise presenting an adhesive between adjacent component parts that is operative to form a fixed and substantially fluid-tight connection therebetween. In such case, it will be appreciated that any suitable adhesive material or combination of materials can be used, such as one-part and/or two-part epoxies, for example. Further still, the term "gas" is used herein to broadly refer to any gaseous or vaporous fluid. Most commonly, air is used as the working medium of gas spring devices, such as those described herein, as well as suspension systems and other components thereof. However, it will be understood that any suitable gaseous fluid could alternately be used.

While the subject matter of the present disclosure has been described with reference to the foregoing embodiments and considerable emphasis has been placed herein on the structures and structural interrelationships between the component parts of the embodiments disclosed, it will be appreciated that other embodiments can be made and that many changes can be made in the embodiments illustrated and described without departing from the principles of the subject matter of the present disclosure. Obviously, modifications and alterations will occur to others upon reading and understanding the preceding detailed description. Accordingly, it is to be distinctly understood that the foregoing descriptive matter is to be interpreted merely as illustrative and not as a limitation. As such, it is intended that the subject matter of the present disclosure be construed as including all such modifications and alterations insofar as they come within the scope of the appended claims and any equivalents thereof.

The invention claimed is:

1. A gas spring assembly comprising:
a flexible wall extending circumferentially about a longitudinal axis and generally longitudinally between opposing first and second ends, said flexible wall at least partially defining a spring chamber of said gas spring assembly;
a first end member operatively connected across said first end of said flexible wall such that a substantially fluid-tight seal is formed therebetween; and,
a piston assembly operatively connected to said flexible wall along said second end thereof such that a substantially fluid-tight seal is formed therewith, said piston assembly including:
an outer shell formed from thin-walled metal material and having a first end and a second end spaced longitudinally from said first end, said outer shell including a side wall extending longitudinally between said first and second ends, said outer shell including an end wall extending transverse to said side wall along said first end and having a first opening extending therethrough, said side wall at least partially defining a second opening along said second end of said outer shell;
an end plate formed from thin-walled metal material and having an outer peripheral edge; and,
an attachment column extending longitudinally between opposing first and second ends, said first end disposed toward said end wall of said outer shell such that said second end is disposed in abutting engagement with said end plate, said second end of said attachment column including a second end wall and a securement feature extending into said attachment column from along said second end wall;
said outer shell, said end plate and said attachment column together defining a piston chamber within said piston assembly in fluid communication with said spring chamber and with a first flowed-material joint disposed between and fixedly attaching said end plate said outer shell to one another such that a fluid-tight seal is formed therebetween and a second flowed-material joint disposed between and fixedly attaching said attachment column and said end plate to one another such that a fluid-tight seal is formed therebetween.

2. A gas spring assembly according to claim 1, wherein said end plate includes an opening formed therethrough, said attachment column includes a first column portion having a first cross-sectional dimension and second column portion having a second cross-sectional dimension that is less than first cross-sectional dimension such that a shoulder wall extends radially between said first and second column portions, said second column portion being received in said opening of said end plate such that said shoulder wall abuttingly engages said end plate.

3. A gas spring assembly according to claim 1, wherein said end plate includes a first side disposed toward said piston chamber and an opposing second side disposed facing away from said piston chamber, and said second flowed-material joint is disposed between said attachment column and said end plate along said first side thereof such that said fluid-tight seal formed thereby fluidically isolates said piston chamber from said opening in said end plate.

4. A gas spring assembly according to claim 1, wherein said outer shell includes an inner surface and an outer surface, said end plate includes a first side disposed toward said piston chamber and an opposing second side disposed facing away from said piston chamber, and an interface is formed between said inner surface of said side wall and said outer peripheral edge of said end plate with said first flowed-material joint disposed between said outer shell and said end plate along said inner surface of said outer shell and said second side of said end plate such that said fluid-tight seal formed thereby permits fluid communication between said piston chamber and said interface while fluidically isolating said piston chamber and said interface from an associated external atmosphere.

5. A gas spring assembly according to claim 1, wherein at least one of said first and second flowed-material joints includes one of a welded joint, a brazed joint and a soldered joint.

6. A gas spring assembly according to claim 1 further comprising an end closure operatively connected across said second end of said flexible wall, said end closure secured to said first end of said attachment column thereby operatively connecting said second end of said flexible wall to said piston assembly.

7. A gas spring assembly according to claim 6, wherein said first end of said attachment column includes a first end wall and a securement feature extending into said attachment column from along said first end wall, and said end closure includes a first opening extending therethrough such that a securement device can operatively engage said securement feature of said first end wall of said attachment column through said first opening.

8. A gas spring assembly according to claim 6, wherein said end closure includes a fluid passage extending therethrough and in fluid communication with said opening of said end wall of said outer shell such that said spring chamber is in fluid communication with said piston chamber of said piston assembly.

9. A gas spring assembly according to claim 6, wherein said end closure includes a first surface disposed in facing relation to said spring chamber and a second surface facing opposite said first surface, and said first end of said attachment column includes a first end wall disposed in abutting engagement with said second surface of said end closure.

10. A gas spring assembly according to claim 1, wherein said end plate includes a first approximately planar portion at least partially defining a first plane, a second approximately planar portion at least partially defining a second plane disposed in longitudinally-spaced relation to said first plane, and third approximately planar portion at least partially defining a third plane dispose in longitudinally-spaced relation to said first plane in a direction opposite said second plane, and said end plate including an opening formed therethrough with said second end of said attachment column received within said opening such that a portion of said attachment column extends longitudinally beyond said third approximately planar portion in a direction toward said second approximately planar portion.

11. A gas spring assembly according to claim 10, wherein said first end of said attachment column is disposed within said first opening of said end wall of said outer shell such that said first end can be transversely displaced with respect to said end wall.

12. A piston assembly for operative connection to an end of an associated flexible sleeve, said piston assembly comprising:
an outer shell formed from thin-walled metal material, said outer shell having a longitudinal axis and longitudinally-spaced first and second ends, said outer shell including a side wall and an end wall, said side wall extending generally longitudinally between said first and second ends and including an inner surface and an outer surface, said inner surface at least partially defining a piston chamber, said outer surface operative to abuttingly engage the associated flexible sleeve, said end wall extending transverse to said side wall along said first end and at least partially defining a first opening along said first end in fluid communication with said piston chamber, said side wall at least partially defining a second opening along said second end;
an end plate formed from thin-walled metal material and including a first side, an opposing second side, and an outer peripheral edge, said end plate received within said second opening of said outer shell such that said outer peripheral edge abuttingly engages said inner surface of said side wall of said outer shell;
an attachment column extending longitudinally between opposing first and second ends with said first end disposed toward said first end of said outer shell and said second end disposed toward said second end of said outer shell, said attachment column abuttingly engaging said first side of said end plate;
a first flowed-material joint disposed between and fixedly attaching said end plate and said outer shell to one another such that a fluid-tight seal is formed therebetween; and,
a second flowed-material joint disposed between and fixedly attaching said attachment column and said end plate to one another such that a fluid-tight seal is formed therebetween.

13. A piston assembly according to claim 12, wherein said end plate includes a first approximately planar portion at least partially defining a first plane and a second approximately planar portion at least partially defining a second plane disposed in longitudinally-spaced relation to said first plane.

14. A piston assembly according to claim 13, wherein said side wall includes a terminal edge disposed along said second end of said outer shell and said end plate is positioned relative to said outer shell such that said first plane is disposed along said side wall within said outer shell and said second plane is disposed longitudinally-outwardly of said outer shell with respect to said terminal edge of said side wall.

15. A piston assembly according to claim 14, wherein said end plate includes a third approximately planar portion at least partially defining a third plane disposed in longitudinally-spaced relation to said first plane in a direction opposite said second plane, and said second end of said attachment column abuttingly engages said third approximately planar portion with said second flowed-material joint disposed between said attachment column and said end plate along said third approximately planar portion thereof.

16. A piston assembly according to claim 15, wherein said third approximately planar portion includes an opening formed through said end plate, said second end of said attachment column is received within said opening such that a portion of said attachment column extends longitudinally beyond said third approximately planar portion in a direction toward said second approximately planar portion.

17. A piston assembly according to claim 16, wherein said first end of said attachment column is disposed within said opening of said end wall of said outer shell such that said first end can be transversely displaced with respect to said end wall.

18. A method of assembling a gas spring assembly, said method comprising:
a) providing a flexible wall that extends longitudinally between opposing first and second ends;
b) providing a first end member and operatively connecting said first end member across said first end of said flexible wall such that a substantially fluid-tight seal is formed therebetween;
c) providing an outer shell, an end plate and an attachment column;
d) forming a piston assembly using said outer shell, said end plate and said attachment column by:

d1) fixedly attaching said attachment column and said end plate to one another using a first flowed-material joint such that a fluid-tight seal is formed therebetween; and, d2) fixedly attaching said end plate and said outer shell to one another using a second flowed-material joint such that a fluid-tight seal is formed therebetween; and, e) operatively connecting said piston assembly to said second end of said flexible wall such that a substantially fluid-tight seal is formed therebetween.

19. A method according to claim 18, wherein fixedly attaching said attachment column and said end plate in d1) includes forming a sub-assembly from said attachment column and said end plate, and forming a piston assembly in d) further includes positioning said sub-assembly at least partially within said outer shell.

20. A method according to claim 19, wherein said end plate includes a plurality of longitudinally-spaced planes and said action of positioning said sub-assembly includes positioning a first plane within said outer shell and positioning a second plane outwardly of said outer shell.

* * * * *

UNITED STATES PATENT AND TRADEMARK OFFICE
CERTIFICATE OF CORRECTION

PATENT NO.        : 8,955,830 B2                                    Page 1 of 1
APPLICATION NO.   : 13/574505
DATED             : February 17, 2015
INVENTOR(S)       : Stephen C. Street It is certified that error appears in the above-identified patent and that said Letters Patent is hereby corrected as shown below:

In the Claims

In column 10, line 33, claim 1, delete "end plate said" and insert -- end plate and said --.

Signed and Sealed this
Nineteenth Day of May, 2015

Michelle K. Lee
*Director of the United States Patent and Trademark Office*